(12) United States Patent  
Bankman et al.

(10) Patent No.: US 8,705,546 B2
(45) Date of Patent: Apr. 22, 2014

(54) REDUNDANCY SWITCH

(75) Inventors: Jesse Bankman, Gibsonville, NC (US); David Rowe, Littleton, MA (US); Herman Eiliya, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 155 days.

(21) Appl. No.: 13/236,319

(22) Filed: Sep. 19, 2011

(65) Prior Publication Data

US 2013/0070774 A1 Mar. 21, 2013

(51) Int. Cl.
*H04L 12/28* (2006.01)
*H04L 12/56* (2011.01)

(52) U.S. Cl.
USPC .......................................... 370/401

(58) Field of Classification Search
None
See application file for complete search history.

(56) References Cited

U.S. PATENT DOCUMENTS

| | | | |
|---|---|---|---|
| 6,961,366 B1 * | 11/2005 | Bendak et al. | 375/214 |
| 8,139,670 B1 * | 3/2012 | Son et al. | 375/267 |
| 2002/0093966 A1 * | 7/2002 | Liva et al. | 370/400 |
| 2003/0119555 A1 * | 6/2003 | Friesen et al. | 455/560 |
| 2007/0180443 A1 * | 8/2007 | Kondo et al. | 717/168 |
| 2009/0268749 A1 * | 10/2009 | Liva et al. | 370/419 |
| 2012/0288027 A1 * | 11/2012 | Stojanovic et al. | 375/295 |

* cited by examiner

*Primary Examiner* — Hassan Phillips
*Assistant Examiner* — Prenell Jones
(74) *Attorney, Agent, or Firm* — Knobbe Martens Olson & Bear, LLP (57) ABSTRACT

A redundancy switch includes at least three data ports and a control input. Each data port includes a data input and a data output. The redundancy switch operates in one of at least three states. In a first state, a first data port is communicatively coupled with a second data port. In a second state, the first data port is communicatively coupled with a third data port. In a third state, the second data port is communicatively coupled with the third data port. The state of the redundancy switch can be controlled based on a signal received at the control input. The redundancy switch can further include transconductance switching elements that convert a voltage input to a current output.

36 Claims, 8 Drawing Sheets

REDUNDANCY SWITCH

BACKGROUND

1. Field

Embodiments of the disclosure relate to electronic devices, and more particularly, in one or more embodiments, to switching elements.

2. Description of the Related Art

Routers are typically used in telecommunication networks, such as the Internet, to transmit packets of information from one location to another. Core routers are capable of routing large amounts of data at very high speeds, and are often used to form part of the backbone of a wide area network, such as the Internet. Currently core routers can transmit data at speeds of 10 Mbps to up to 10 Gbps, and even higher. Core routers can include a number of card slots with different line cards that are interconnected via a backplane. The core router can receive data on an ingress card and then transmit the data over an egress card using a switching fabric. In addition, the different cards can interface with different mediums, and the core routers can receive data via one medium and transmit the same data over a different medium using a different line card. For example, a core router can receive data from a fiber-optic channel via one line card and then transmit the same data over a DSL channel via another line card.

Similarly, edge routers can be used to connect a user terminal to a first branch of a network, such as the Internet. Similar to core routers, edge routers can receive information over a first medium and then transmit that same information over a different medium. In addition, edge routers can transmit the data at very high speeds, and can aggregate the data received prior to transmitting the data to the next hop, or the next router.

Due to the speeds at which core and edge routers (also referred to as network routers) operate, poor impedance matching between the different line cards within the router can lead to reflections on the data line, lower signal-to-noise ratio, and errors. As previously mentioned, to transmit the data from an ingress line card to an egress line card, the network router can use a switching fabric in one of the card slots. In many instances, two switching fabrics are included within the network router. The first switching fabric is a primary switching fabric and the second switching fabric is a backup switching fabric, which can be used if the primary switching fabric cannot be used.

At times, it is desirable to analyze the data within a line card for informational or debugging purposes. Analyzing the data as it passes through the line card can be difficult and typically uses a number of additional components on the line card. The additional components used to analyze the data take additional space on the line card and make it increasingly difficult for the line card to contain all the components needed to receive and transmit data.

SUMMARY

An electrical circuit, or apparatus, is described that includes a plurality of data inputs and data outputs, as well as a control input. The plurality of data inputs can include at least a first data input, a second data input, and a third data input. The plurality of data outputs can include at least a first data output, a second data output, and a third data output. The control input can be configured to control a state of the electrical circuit. The electrical circuit can be configured between a first state, a second state, and a third state. In a first state, the first data input is communicatively coupled with the second data output and the second data input is communicatively coupled with the first data output. In a second state, the first data input is communicatively coupled with the third data output and the third data input is communicatively coupled with the first data output. In a third state, the second data input is communicatively coupled with the third data output and the third data input is communicatively coupled with the second data output.

In certain embodiment, the third data input is communicatively coupled with the third data output in the first state. In an embodiment, the second data input is communicatively coupled with the second data output in the second state. In an embodiment, the first data input is communicatively coupled with the first data output in the third state. In an embodiment, the first data input is further communicatively coupled with the third data output in the first state. In an embodiment, the second data input is further communicatively coupled with the third data output in the first state. In an embodiment, the first data input is further communicatively coupled with the second data output in the second state. In an embodiment, the second data input is further communicatively coupled with the third data output in the second state. In an embodiment, the second data input is further communicatively coupled with the first data output in the third state. In an embodiment, the third data input is further communicatively coupled with the first data output in the third state.

In certain embodiments, the control input is an input pin of the integrated circuit chip and the state of the redundancy switch is determined based on a voltage level at the input pin. In an embodiment, the electrical circuit enters the first state when the control input is set at a first voltage, enters the second state when the control input is set at a second voltage, and enters the third state when the control input is set at a third voltage that is between the first voltage and the second voltage. In another embodiment, the control input includes a plurality of input pins of the integrated chip and the state of the redundancy switch is determined based on a configuration of activated input pins of the plurality of input pins.

In certain embodiments, the electrical circuit can further include additional states. In an embodiment, in a fourth state, the first data input is communicatively coupled with the first data output, the second data input is communicatively coupled with the second data output; and the third data input is communicatively coupled with the third data output. In an embodiment, in a fifth state, one data input is communicatively coupled with the first data output, the second data output, and the third data output. In an embodiment, the one data input is one of the first data input, the second data input, and the third data input. In an embodiment, in a sixth state, the first data input is communicatively coupled with the second data output, the second data input is communicatively coupled with the third data output; and the third data input is communicatively coupled with the first data output.

In certain embodiments, the apparatus further includes a plurality of switching elements configured to communicatively couple one input to one output based on a selected control input. In an embodiment, the plurality of switching elements include transconductance switching elements configured to convert a voltage input to a current output. In another embodiment, the electrical circuit further includes a plurality of multiplexers and demultiplexers.

In another embodiment, an electrical circuit, or apparatus, is described that includes at least a first receiver, a second receiver, a third receiver, a first transmitter, a second transmitter, and a third transmitter. Each receiver can include an input, a first output, a second output, and a third output. Each transmitter can include a first input coupled to an output of each of the receivers. In an embodiment, the first input of the first transmitter can be coupled to the first output of the first receiver, to the first output of the second receiver, and to the first output of the third receiver. In an embodiment, the first input of the second transmitter can be coupled to the second output of the first receiver, to the second output of the second receiver, and to the second output of the third receiver. In an embodiment, the first input of the third transmitter can be coupled to the third output of the first receiver, to the third output of the second receiver, and to the third output of the third receiver.

DETAILED DESCRIPTION

The following detailed description of certain embodiments presents various descriptions of specific embodiments of the disclosure. However, the other embodiments of the disclosure can be implemented in a multitude of different ways as defined and covered by the claims. In this description, reference is made to the drawings where like reference numerals indicate similar elements.

Generally described, aspects of embodiments of this disclosure relate to a redundancy switch configured to provide a communication path between three separate components. The communication path can be in the form of single wires, differential signaling, optical communication, and the like. The redundancy switch can be used within a line card to analyze data as it passes between different components of the line card, such as the physical interface and MAC framer. In addition, the redundancy switch can be used to provide communication between different line cards without using a switching fabric. In one embodiment, the redundancy switch can provide a non-blocking communication path between three different components without initialization procedures, such as register initialization, from a microprocessor. In an embodiment, the redundancy switch does not include a serial interface to control the state of the redundancy switch or for initialization. In one embodiment, an array of switching elements are used to provide the redundancy non-blocking communication paths.

Figure 1:
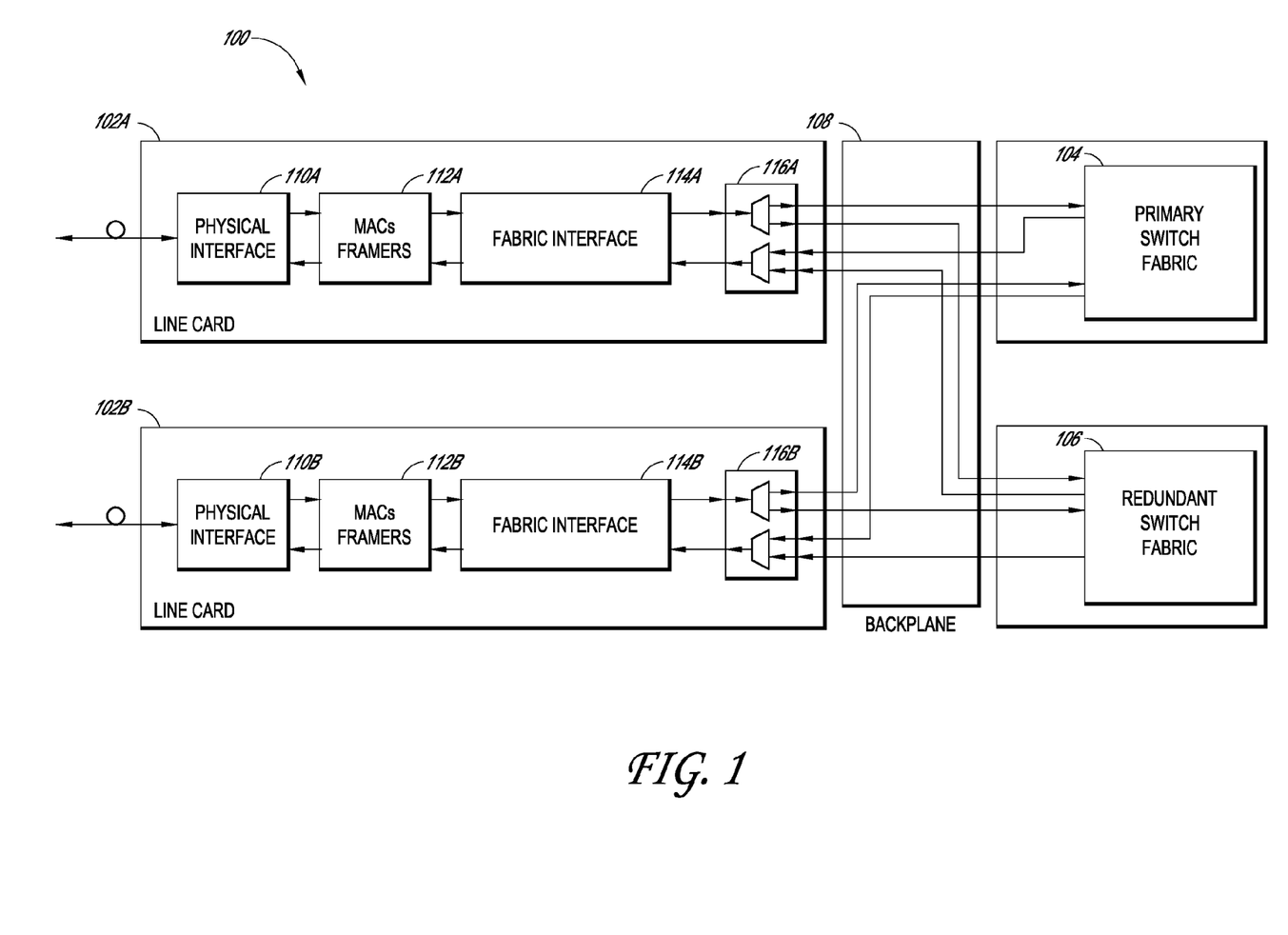
FIG. 1 is a schematic block diagram illustrative of an embodiment of a portion of a router.

FIG. 1 is a block diagram illustrative of an embodiment of a portion of a router 100. The router 100 can be any number of different types of routers including, but not limited to, an edge router, a core router, or any other similar router capable of receiving packets of data and transmitting and forwarding the packets of data to another router or destination.

The router 100 includes line cards 102A, 102B, a primary switch fabric 104, a redundant switch fabric 106, and a back plane 108. The line cards 102A, 102B communicate with the primary switch fabric 104 and the redundant switch fabric 106 via the back plane 108. Each line card 102A, 102B includes a physical interface 110, a MAC framer 112, a fabric interface or a network processor 114, and a mux/demux element 116. The line cards 102A, 102B can be used to receive or transmit data over a network, such as a LAN, a WAN (e.g., the interne) etc.

Each line card 102 (102A or 102B) can receive or transmit packets of data from a user terminal or another router. The data received is processed by the physical interface 110, MAC framer 112 and fabric interface 114. The data is then transmitted to the primary switch fabric 104 using the mux/demux 116 via the back plane 108. In certain instances, such as when the primary switch fabric 104 fails, the data can be rerouted from the line card 102A or the line card 102B to the redundant switch fabric 106 via the back plane 108 by operating the mux/demux 116A, 116B.

The primary switch fabric 104, or the redundant switch fabric 106, routes the data received from the line card 102A to another line card, such as the line card 102B, based on the next destination for the data. The data is received at the line card 102B through the mux/demux 116B. The data then processed by the fabric interface 114B and prepared for transmission by the MAC framers 112B and the physical interface 110B. The data is then transmitted over a transmission medium to its proximate destination, which can include another router or user terminal.

The components of the line card 102A will now be explained with greater detail. However, it will be understood that the explanation of the components of line card 102A equally apply to the components of line card 102B. Line card 102A includes a physical interface 110A, MAC framers 112A, a fabric interface 114A and a mux/demux 116A. The various components 110A, 112A, 114A, 116A communicate with each other to process the packets of data prior to transmission or upon receipt. The physical interface 110A provides the interface between the physical layer and the data link layer of the router 100. Any number of protocols can be used by the physical interface 110A in order to transmit and receive packets of data.

The MAC framer 112A provides addressing and channel access control mechanisms that make it possible for the router 100 to communicate with other routers and/or a user terminal. The fabric interface 114A analyzes the packets of data processed by the MAC framer 112A to aid the router in determining the proximate destination for the data. The fabric interface 114A can also relay data to the physical interface, encapsulate the data in a wrapper, perform packet inspection, error detection and correction, and the like. The mux/demux 116A allows the line card 102A to communicate with the primary switch fabric 104 and the redundant switch fabric 106. Using the mux/demux 116A, the line card 102A can receive and/or transmit data to and from the primary switch fabric 104 and the redundant switch fabric 106.

As mentioned, at times, it is desirable to analyze the data received or transmitted by the physical interface 110A or the MAC framer 112A. Analyzing the input and/or output of the physical interface 110A and the MAC framer 112A can be difficult and complicated without also adding a number of additional components to the line card 102A. The additional components used to analyze the input and output of the physical interface 110A and the MAC framer 112A take additional space on the line card and make it increasingly difficult for the line card to contain all the components used to receive and transmit data.

Figure 2A:
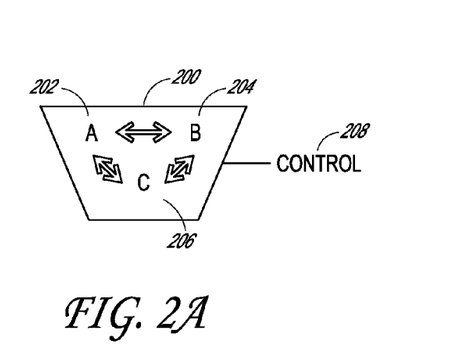
FIG. 2A is a schematic block diagram of a redundancy switch configured to allow non-blocking communication between three different components.

FIG. 2A is a block diagram of a redundancy switch 200 configured to allow communication between three different components. The redundancy switch 200 includes a port A 202, a port B 204, a port C 206, and a control input 208. Each port includes an input and an output. In one embodiment, data from any of port A 202, port B 204, and port C 206 can be transmitted to any other port. In one embodiment, port A 202, port B 204, and port C 206 can also loop back, as will be described in greater detail below with reference to FIGS. 2B-2D. As used herein, communication between a first port and a second port refers to components attached to the first port and second port, respectively, being able to transmit and receive data to each other using the redundancy switch 200. The control input 208 can be used to configure the state of the redundancy switch. Based on the state, the redundancy switch 200 enables communication between the different ports. The control input can be implemented, for example, using one or more control pins of an integrated circuit chip, one or more control lines, etc., as will be described in greater detail below with reference to FIGS. 2B-2D.

Figure 3A:
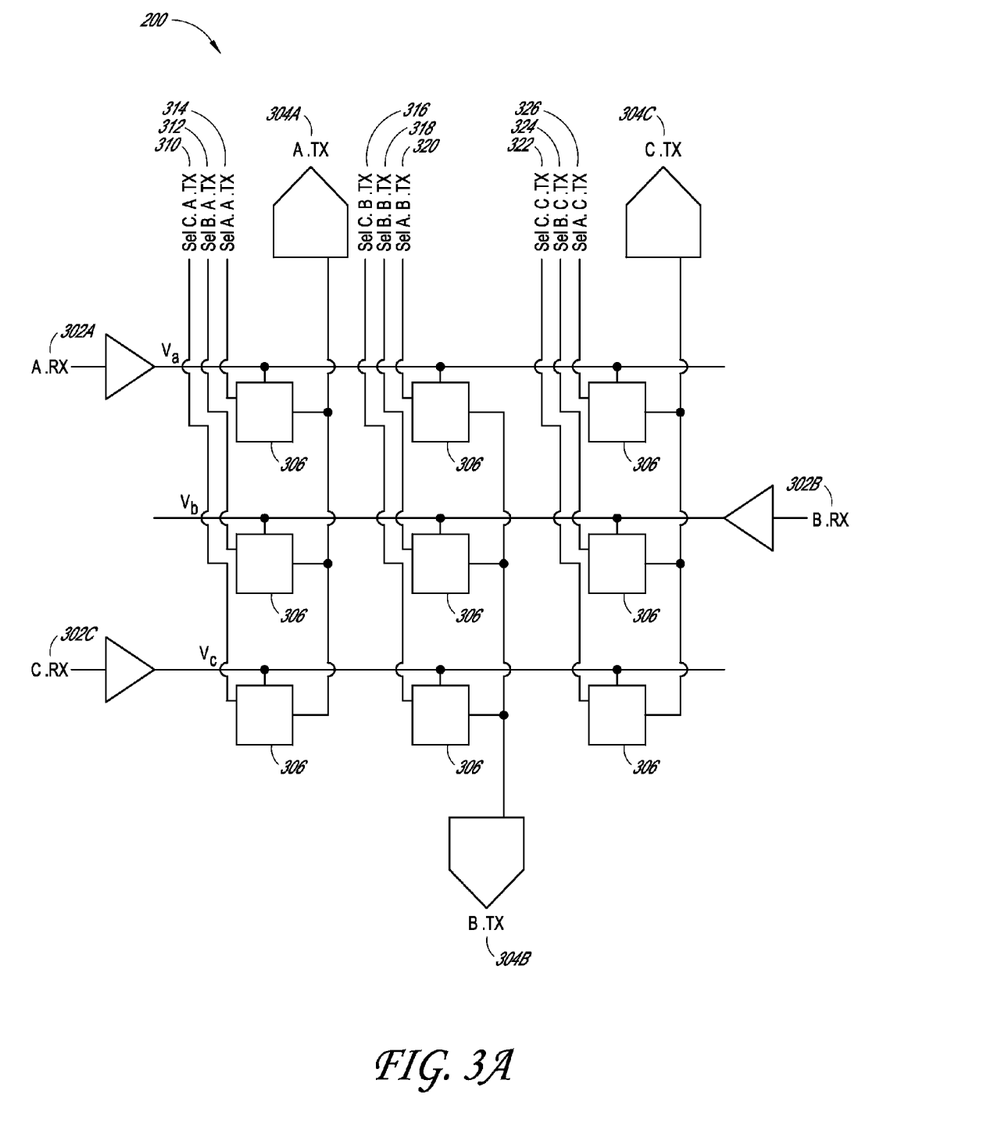
FIG. 3A is a schematic block diagram illustrative of a redundancy switch implemented using multiple switching elements.
Figure 3B:
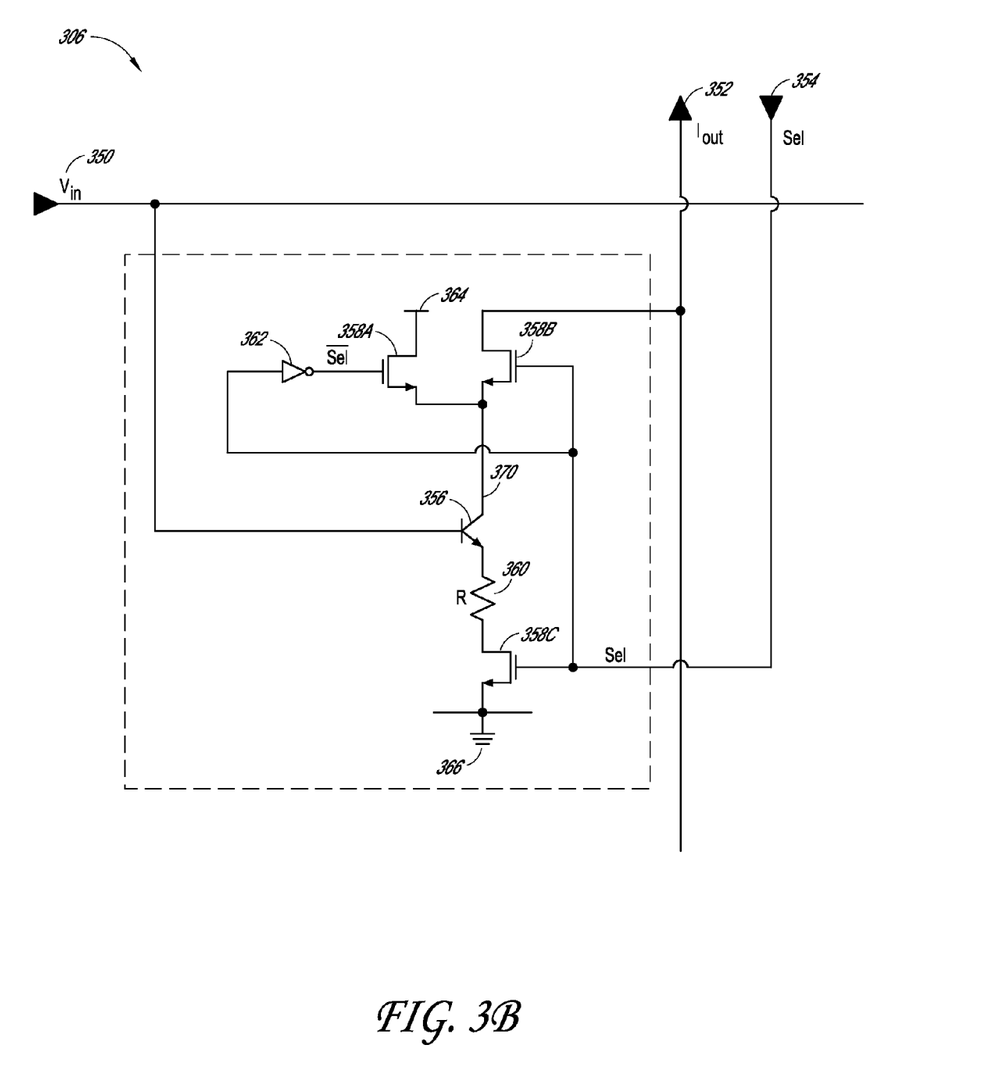
FIG. 3B is a schematic block diagram illustrative of a switching element as used in conjunction with the redundancy switch of FIG. 3A.
Figure 4:
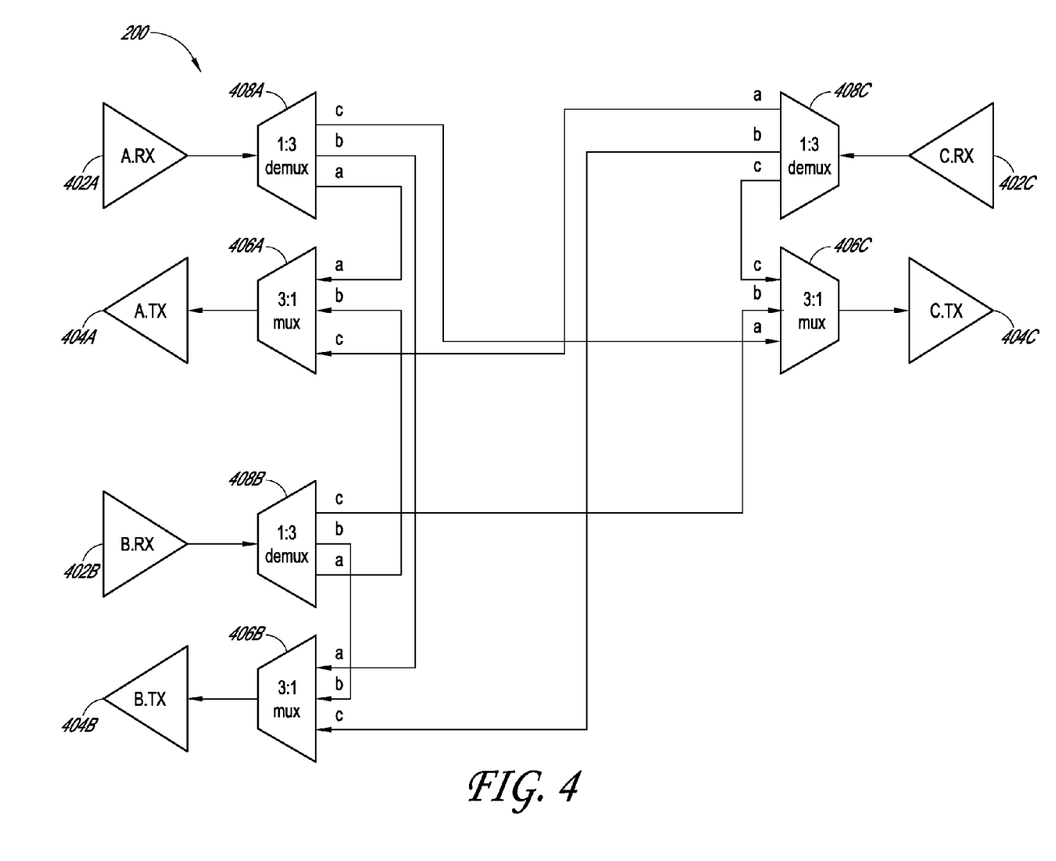
FIG. 4 is a schematic block diagram illustrative of a redundancy switch implemented using 3:1 multiplexors and 1:3 demultiplexers.
Figure 5:
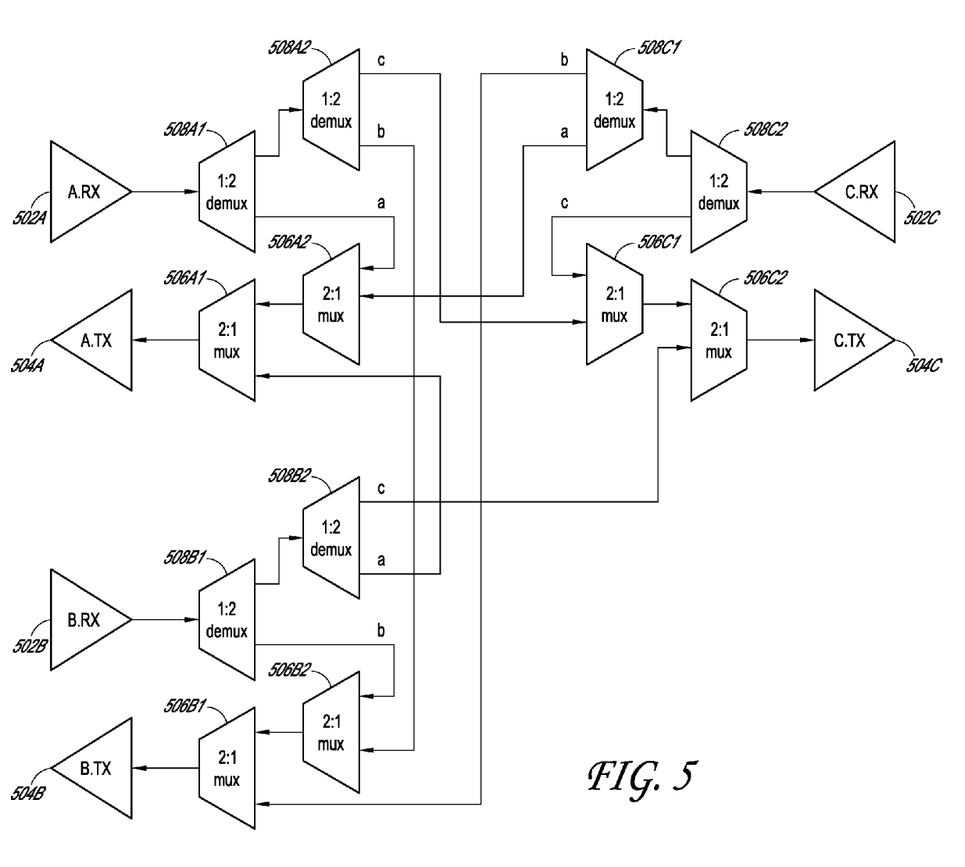
FIG. 5 is a schematic block diagram illustrative of a redundancy switch implemented using 2:1 multiplexors and 1:2 demultiplexers.

The redundancy switch 200 can be used by the line card 102A to allow the input and output of the physical interface 110A and the MAC framer 112A to be analyzed using a field programmable gate array (FPGA), programmable logic device (PLD), ASIC, and the like. Alternatively, the input and output of the physical interface 110A and the MAC framer 112A can be provided to an external port for further analysis by an external computer device. The three-way switch can be implemented without adding additional components or using additional processing power. In other words, the redundancy switch 200 can be implemented without any additional processing requirements or registers, and can be controlled via the control input 208. The redundancy switch 200 can be implemented using any number of different components, such as switching elements or transconductance elements, 3:1 multiplexers and 1:3 demultiplexers, 2:1 multiplexers and 1:2 demultiplexers, and the like. The transconductance elements can convert a voltage input to a current output. The various techniques for implementing the redundancy switch will be described in greater detail below with reference to FIGS. 3-5. FIGS. 3A and 3B are block diagrams illustrating an embodiment of the redundancy switch using switching elements and/or transconductance elements. FIG. 4 is a block diagram illustrating an embodiment of the redundancy switch using 3:1 multiplexers and 1:3 demultiplexers. FIG. 5 is a block diagram illustrating an embodiment of the redundancy switch using 2:1 multiplexers and 1:2 demultiplexers.

Figure 2B:
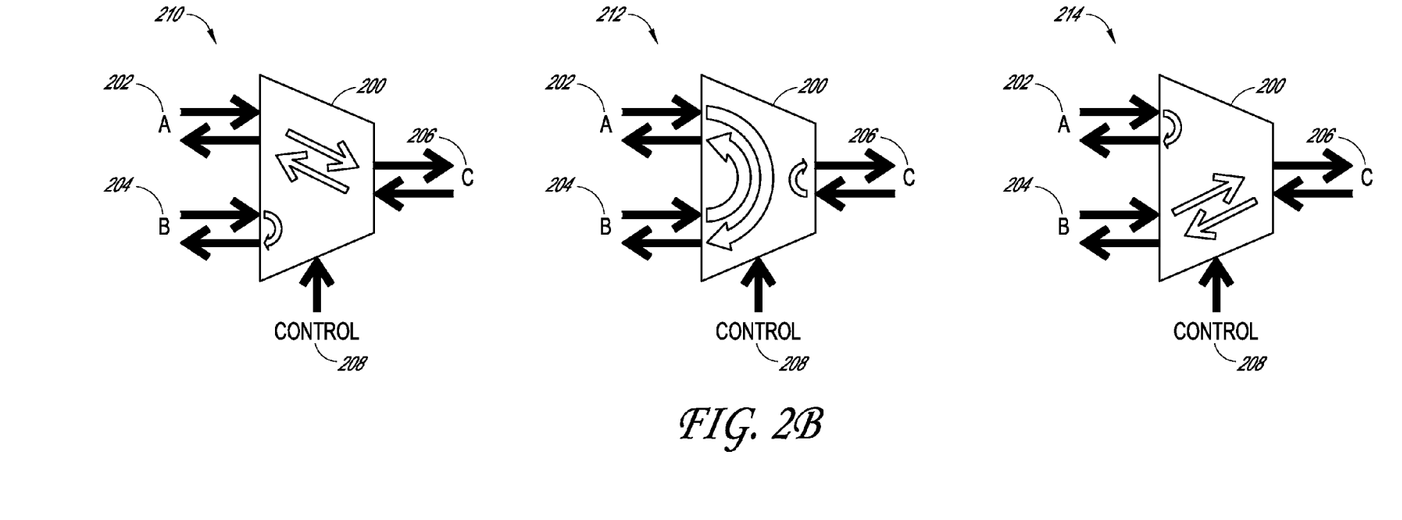
FIG. 2B illustrates different states for one embodiment of the redundancy switch with three-state control.

FIG. 2B illustrates the different states that can exist for one embodiment of the redundancy switch 200 when implemented with a three-state control input 208. In the embodiment illustrated in FIG. 2A, the redundancy switch 200 includes at least three states, state '0' 210, state '1' 212, and state '2' 214. The control input 208 can be used to control the state of the redundancy switch 200. For example, when the control input is a logic '0' the redundancy switch 200 can enter state '0' 210, when the control input is a voltage between a logic '0' and a logic '1' the redundancy switch 200 is in state '1' 212, and when the control input is a logic '1' the redundancy switch 200 is in state '2' 214. As mentioned previously, the control input 208 can be implemented as a control pin on an integrated circuit chip, a control line, and the like.

When in state '0' 210, the redundancy switch 200 allows communication between port A 202 and port C 206. In addition, port B 204 communicates with itself. In state '1' 212, the redundancy switch 200 enables communication between port A 202 and port B 204. In addition, when in state '2' 214, the redundancy switch 200 enables port A 202 to loop back and communicate with itself. As used herein, loop back refers to a component attached to a port of the redundancy switch 200 being able to send data to the redundancy switch 200 and have the redundancy switch 200 transmit that data back to the component. In the illustrated embodiment, each port includes both the inputs and the outputs of that port. When a port is described as looping back, data from the input of that port is looped back to the output of that port.

Various alternatives for each state can be implemented without departing from the spirit of the description. The configuration for each state is not fixed and can be implemented in any number of ways. For example, state '0' 210 can enable communication between port A 202 and port B 204, or between port B 204 and port C 206. State '1' 212 and state '2' 214 can be similarly altered.

Furthermore, additional, or alternative states can be used. For example, state '0' 210 can further enable data flow from port C 206 to port B 204, in addition to the communication between ports A 202 and C 206. Thus, the data from port C 206 can be transmitted to port A 202, as well as port B 204. Alternatively, state '0' can enable data from port A 202 to be transmitted to port B 204. Similar results can be achieved with state '1' 212 and state '2' 214. Data from one port can be transmitted to the other two ports.

Figure 2C:
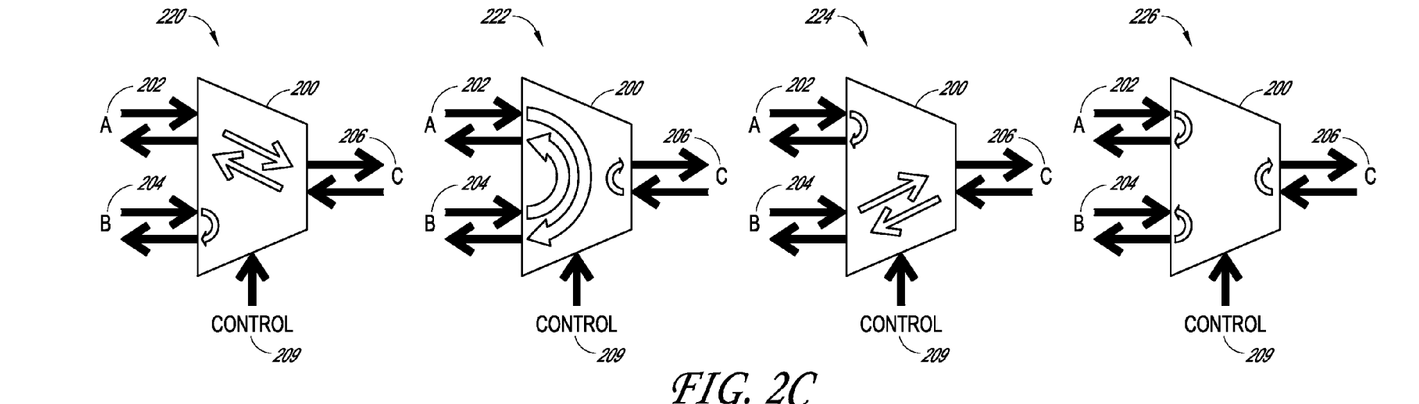
FIG. 2C is a schematic block diagram illustrative of a redundancy switch with at least four states.

FIG. 2C is a schematic block diagram illustrating an embodiment of the redundancy switch 200 having at least four states. To implement the four states, the redundancy switch 200 can include at least two input parameters as the control input 209. Additional input parameters can be added for additional states as desired. The input parameters can be implemented as control pins on an integrated circuit chip, select lines, wires, and the like.

State '0' 220 is similar to state '0' 210 of FIG. 2B, and when in state '0' 220, the redundancy switch 200 enables communication between port A 202 and port C 206. In addition, port B 204 is configured to loop back. In other words, the component attached to port B transmits data to the redundancy switch 200 and receives the same data from the redundancy switch, while the components attached to port A 202 and port C 206 transmit and receive data from each other.

The redundancy switch 200, when in state '1' 222, enables communication between port A 202 and port B 204. In state '1' 222, port C 206 is configured to loop back. In state '2' 224, the redundancy switch 200 enables communication between port B 204 and port C 206, and port A communicates with itself. When in state '2' 224, port A 202 is configured to loop back and communicate with itself. In state '3' 226, the redundancy switch 200 enables each port to communicate with itself via a loop back. Thus, port A 202 communicates with itself, port B 204 communicates with itself, and port C 206 communicates with itself.

Various alternatives for each state can be implemented without departing from the spirit of the description. The configuration for each state is not fixed and can be implemented in any number of ways. For example, state '0' 220 can enable communication between port A 202 and port B 204, between port B 204 and port C 206, or each port can communicate with itself. State '1' 222, state '2' 224, and state '3' 226 can be similarly altered.

Figure 2D:
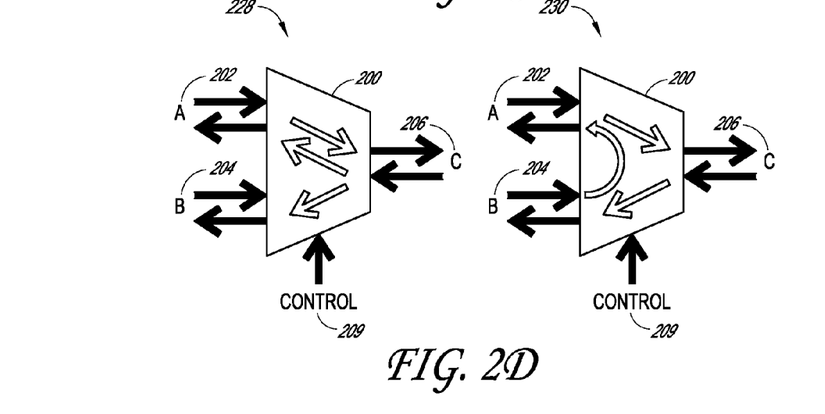
FIG. 2D is a schematic block diagram illustrative of additional states of a redundancy switch.

FIG. 2D is a block diagram illustrating additional states that can be used with the redundancy switch 200. In state '4' 228, the redundancy switch 200 enables communication between port A 202 and port C 206. In addition to enabling communication between port A 202 and port C 206, the redundancy switch 200 propagates the data received from port C 206 to port B 204. In this manner, port A 202 and port B 204 receive the same data from port C 206. However, in this configuration, data from port B 204 is not transmitted to port C or port A. Similar states can be constructed such that the data from port A 202 is propagated to port B 204 and port C 206, or so that the data from port B 204 is propagated to port A 202 and port C 206, etc.

State '5' 230 illustrates yet another state for the redundancy switch 200. In state '5' 230, the data from each port is propagated to a different port. As illustrated, the data received from port C 206 is propagated to port B 204. The data received at port B 204 is propagated to port A 202. The data received from port A 202 is propagated to port C 206. Thus, the redundancy switch 200 enables data to be passed from the different ports. Additional or alternative states can be constructed such that the data from port A 202 is propagated to port B 204, data from port B 204 is propagated to port C 206, and data from port C 206 is propagated to port A 202. Alternatively, the communication between the different ports can be configured in any number of different ways without departing from the spirit and scope of the description. For example, the data from port A 202 can be broadcast to port B 204, port C 206, and loopback to port A 202.

FIG. 3A is a block diagram illustrating an embodiment of the redundancy switch 200 implemented using multiple switching elements. In the embodiment illustrated, the redundancy switch 200 includes three receivers 302A, 302B, 302C, three transmitters 304A, 304B, 304C, multiple switching elements 306, and control inputs 310-326.

The switching elements 306 enable any of the receivers 302A, 302B, 302C to communicate and transmit information to any one of the transmitters 304A, 304B, 304C. The switching elements can be implemented using any number of different configurations, such as transconductive elements, and analog or digital devices including, but not limited to, MOSFET devices, p-type or n-type transistors, bipolar junction transistor, resistors, capacitors, inductors, op-amps, inverters, and the like. FIG. 3B is a schematic block diagram of an illustrative embodiment of a switching element 306, however, it will be understood that a variety of techniques can be used to implement the switching elements 306, and the embodiment illustrated in FIG. 3B should not be construed as limiting.

The control inputs 310-326 activate the switching elements 306 to enable the communication between the receivers 302A, 302B, 302C, and the transmitters 304A, 304B, 304C. The control inputs 310-326 can be implemented as wires, select lines, control pins, etc.

The switching elements 306 and control inputs 310-326 can be configured such that the redundancy switch 200 acts as a non-blocking switch, enabling simultaneous communication between multiple receivers 302A, 302B, 302C, and multiple transmitters 304A, 304B, 304C. For example, in a non-blocking configuration receiver A 302A can be configured to communicate with transmitter C 304C at the same time that receiver B 302B is in communication with transmittal A 304A. Thus, at the same time that data is being transmitted from receiver A 302A to transmitter C 304C, data can also be transmitted from receiver B 302B to transmitter A 304A. In one embodiment, for the three receivers 302A, 302B, 302C and the three transmitters 304A, 304B, 304C, the redundancy switch 200 uses at least nine switching elements 306 and at least nine control inputs 310-326.

As an example, not to be construed as limiting, data from the receiver A 302A is to be propagated to transmitter C 304C. Based on the desired propagation of data, the control input 326 is activated. By activating the control input 326, the data from the receiver A 302A is able to propagate to transmitter C 304C via the switching element 306. The data can also be simultaneously transmitted to transmitter B 304B by activating the control input 320. In addition, as mentioned previously, the configuration illustrated in FIG. 3A is a non-blocking configuration. As such, simultaneous to the communication from receiver A 302A and transmitter C 304C, a second communication can also occur between receiver A 302A and transmitter B 302B by activating the control input 320. Additional communications can also occur simultaneously.

FIG. 3B is a schematic diagram illustrating an embodiment of a switching element 306 implemented as a switched transconductance element. As illustrated, the switching element 306 includes an input 350, output 352, a control input 354, a bipolar junction transistor (BJT) 356, multiple MOSFET transistors 358A, 358B, 358C, a resistor 360, an inverter 362, a voltage source 364, and a ground 366. It is to be understood that FIG. 3B is an illustration of only one example of an embodiment of the switching element 306. Additional embodiments, configurations, architectures, etc., can be used. For example additional, fewer, or different components can be used to implement the switching element 306.

As illustrated in FIG. 3B, the source of the transistor 358A is connected to the voltage source 364 and the drain of transistor 358A shares a node 370 with the drain of the transistor 358B and the collector of the BJT 356. The output of the inverter 362 is connected to the gate of the transistor 358A, and the input of the inverter 362 shares a node with the gates of the transistors 358B, 358C. The source and drain of the transistor 358B is in series with the collector and emitter of the BJT 356, the resistor 360, the source and drain of the transistor 358C and a voltage supply 366 which can be ground. The base of the BJT 356 is connected to the input 350 of the switching element 306. The output 352 is connected to the source of the transistor 358B, and the control input is connected to the gates of the transistors 358B and 358C, as well as to the input of the inverter 362.

The function and operation of the illustrated embodiment of FIG. 3B will now be described. Upon activation of the control input 354, the transistors 358B and 358C are activated, and the transistor 358A is deactivated. As such, the voltage source 364 is effectively removed from the circuit. The activation of transistor 358C connects the bottom portion of the resistor 360 to ground 366, enabling current to flow through the BJT 356 to ground 366. As such, when a voltage exists at the base of the BJT 356, a voltage drop is realized across the resistor 360. The current flowing between the BJT 356 and ground 366 is received at the output 352 due to the activation of the transistor 358B. Thus, when the control input 354 is activated, the voltage at input 350 is converted to a current before arriving at the output 352. The current is then used as the output 352.

Upon deactivation of the control input 354, the transistors 358B and 358C are deactivated, and the transistor 358A is activated. Upon deactivation of the transistor 358C, the resistor R360 is no longer connected to the ground 366 and thus no current is allowed to flow between the BJT transistor 356 and ground 366. In addition, the activation of the transistor 358A allows the voltage source 364 to be connected to node 370. As such, any signal received from VIN 350 and passing through the BJT 356 is lost due to the voltage signal received from the voltage source 364. Accordingly, no current from node 370 is seen on the output 352.

As mentioned previously, the switching element 306 can be implemented using any variety of different components including additional transistors, p-type transistors, BJTs, heterojunction bipolar transistors (HBT), op-amps, field-effect transistors (FET), diodes, optical components, relays, and the like. Accordingly the embodiment illustrated in FIG. 3B should not be construed as limiting.

FIG. 4 is a block diagram illustrating an embodiment of the redundancy switch 200 implemented using 3:1 multiplexers and 1:3 demultiplexers. As illustrated, the switching the redundancy switch 200 includes multiple receivers 402A, 402B, 402C and multiple transmitters 404A, 404B, 404C, as well as a number of 3:1 multiplexers 406A, 406B, 406C, and 1:3 demultiplexers 408A, 408B, 408C. Each demultiplexer 408A, 408B, 408C includes an input, three outputs, and a control input, and each multiplexer 406A, 406B, 406C includes three inputs, one output, and a control input.

Each receiver 402A, 402B, 402C is associated with a 1:3 demultiplexer 408A, 408B, 408C, respectively. Each transmitter 404A, 404B, 404C is associated with a 3:1 multiplexer 406A, 406B, 406C, respectively. The output of each demultiplexer 408A, 408B, 408C, is in communication with an input of each multiplexer 406A, 406B, 406C. Thus, each demultiplexer 408A, 408B, 408C transmits data to each multiplexer 406A, 406B, 406C based on the control input. The multiplexers 406A, 406B, 406C select which input to transmit to the respective transmitter 404A, 404B, 404C based on the control input.

The flow of an incoming signal will now be described with reference to receiver 'A' 402A. Upon receiving data for transmission, receiver 'A' 402A transmits the data to the 1:3 demultiplexer 408A. Based on the control input and/or state of the redundancy switch 200, the 1:3 demultiplexer 408A selects output will transmit the data received on the input.

For purposes of this example, the redundancy switch is in state '1' 212 of FIG. 2B or in state '2' 222 of FIG. 2C. In each of these states, the redundancy switch is configured to enable communication between port A and port C. Thus, the data received at the receiver 'A' 402A is configured to be sent to transmitter 'B' 404B. Based on this state, the demux 408A outputs the data from the receiver 'A' 402A to output 'B' for communication to the transmitter 'B' 404B. Accordingly, the data is transmitted to the multiplexer 406B. Based on the current state as mentioned previously, the data from the demux 408A is selected for output by mux 406B to the transmitter 'B' 404B.

In a similar manner, data received at the receiver 'B' 402B is transmitted to the demux 408B, which selects output 'A' for the data to be transmitted to the mux 406A. Based on the current state, the data received from demux 408B on input 'B' is selected by mux 406A for transmission to the transmitter 'A' 404A. As mentioned previously, the redundancy switch 200 can be configured in a variety of states allowing for the transmission of data between any one of the receivers 402A, 402B, 402C, to any one of the transmitters 404A, 404B, 404C. The illustrated embodiment of the redundancy switch 200 in FIG. 4 can also be referred to as a non-blocking implementation because the transmission of data from one port to another does not block transmission between other ports. For example, as data from the receiver 'A' 402A is transmitted to the transmitter 'B' 404B, data from the receiver 'C' 402C can still be transmitted to the transmitter 'A' 404A.

FIG. 5 is a block diagram illustrating an embodiment of the redundancy switch 200 implemented using 2:1 multiplexers 506A1, 506A2, 506B1, 506B2, 506C1, 506C2 (generally referred to as multiplexers 506 or mux 506) and 1:2 demultiplexers 508A1, 508A2, 508B1, 508B2, 508C1, 508C2 (generally referred to as demultiplexers 508 or demux 508). The embodiment illustrated in FIG. 5 is similar in many respects to the embodiment illustrated in FIG. 4, except that the redundancy switch 200 is implemented using 2:1 multiplexers 506 and 1:2 demultiplexers 508 instead of 3:1 multiplexers 406 and 1:3 demultiplexers 408.

Each receiver 502A, 502B, 502C is associated with two 1:2 demultiplexers 508, and each transmitter 504A, 504B, 504C is associated with two 2:1 multiplexers 506. Each demultiplexer 508A, 508B, 508C includes an input, two outputs, and a control input, and each multiplexer 506A, 506B, 506C includes two inputs, one output, and a control input.

The combined outputs of each of the two demultiplexers associated with a port is in communication with the combined inputs of each of the two multiplexers associated with a port based on the state of the redundancy switch 200. For example, the demultiplexers 508A1 and 508A2 are associated with the receiver 'A' 502A. The combined outputs of the demultiplexers 508A1 and 508A2 reach the inputs of the combined inputs of the multiplexers 506A1, 506A2 associated with the transmitter 'A' 504A, the combined inputs of the multiplexers 506B1, 506B2 associated with the transmitter 'B' 504B, and the combined inputs of the multiplexers 506C1, 506C2 associated with the transmitter 'C' 504C. In this way, each receiver 502A, 502B, 502C is able to communicate with each transmitter 504A, 504B, 504C. The state of the redundancy switch 200 and control inputs of the individual muxes 506 and demuxes 508 determine which receiver 502A, 502B, 502C communicates with which transmitter 504A, 504B, 504C.

The flow of data through the redundancy switch 200 illustrated in FIG. 5 will be better understood through an example in which the redundancy switch 200 is in state '0' 210, 220 of FIGS. 2B and 2C, respectively. In state '0' 210, 220 of FIGS. 2B and 2C, respectively, the redundancy switch 200 enables communication between port 'A' 202 and port 'C' 206. Based on the state, the control inputs of the individual muxes 506 and demuxes 508 are set accordingly. In this way, the data from receiver 'A' 502A can be configured to be transmitted to the transmitter 'C' 504C and data from receiver 502C can be configured to be transmitted to the transmitter 'A' 504A.

Data received at the receiver 'A' 502A is transmitted to the demux 508A1, and is further transmitted to the demux 508A2 based on the control inputs of the individual demuxes. The data from the demux 508A2 is received at the mux 506C1. Based on the current state, the appropriate control inputs are activated such that the data from demux 508A2 is passed from mux 506C1 to mux 506C2 and onto the transmitter 'C' 504C. Similarly, data received by receiver 'C' 502C is transmitted to the demux 508C2 and to the demux 508C1, based on the appropriate control inputs being activated and the state of the redundancy switch 200. The demux 508C1 forwards the data to the mux 506A2, which forwards the data to the mux 506A1 and finally to the transmitter 'A' 504A.

As mentioned previously, the control inputs on the different multiplexers 506 and demultiplexers 508 are activated such that the port A, which includes receiver 'A' 502A and the transmitter 'A' 504A, can communicate with port C, which includes receiver 'C' 502C and the transmitter 'C' 504C. As mentioned previously, different states for the redundancy switch can be selected, such that communication between any port can occur with any other port. Thus, port A can communicate with port B, C or A. Similarly, port B can communicate with port A, port B, or port C, and port C can communicate with port A, port B, or port C.

Figure 6:
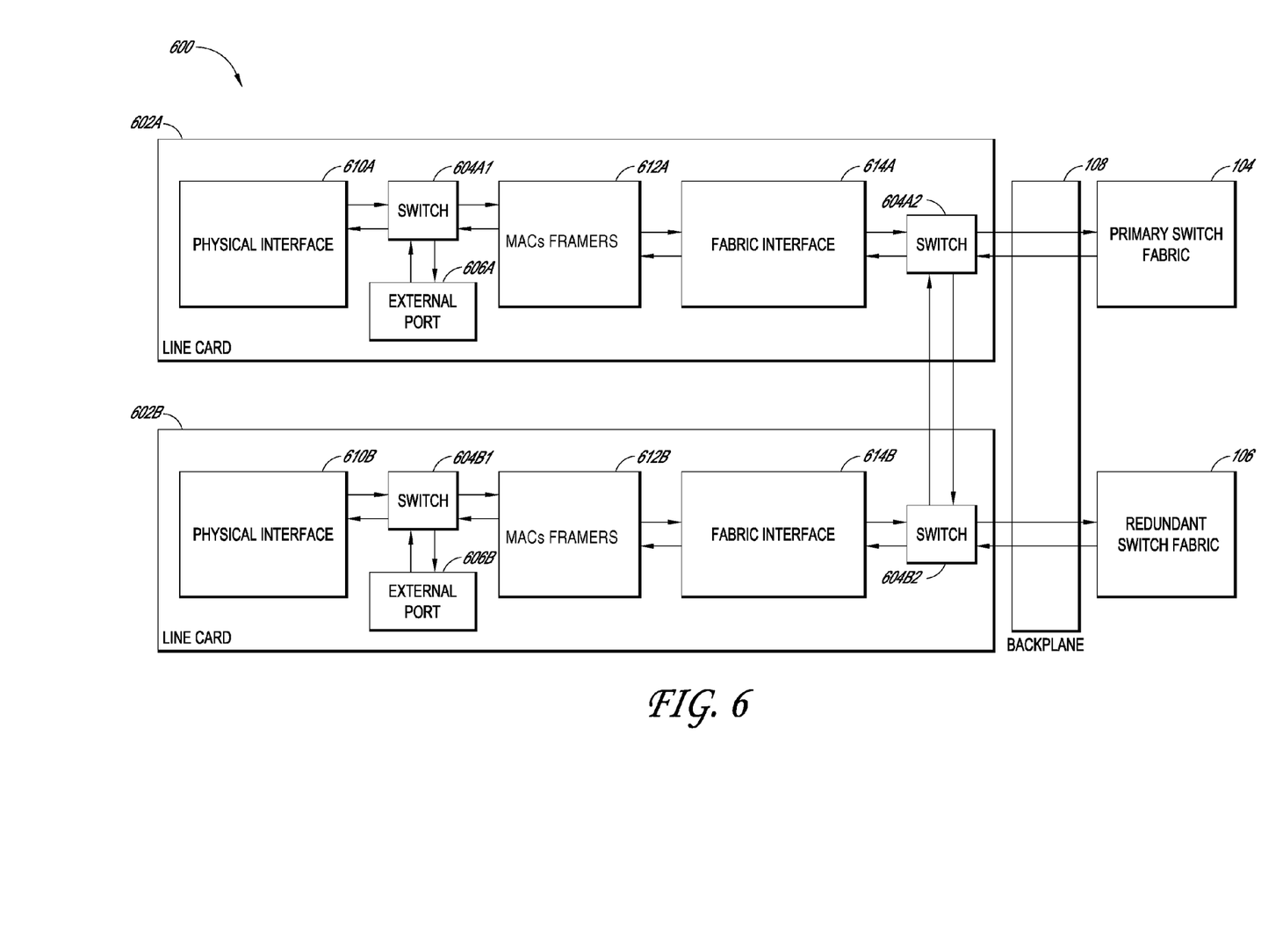
FIG. 6 is a schematic block diagram illustrative of a router, which includes switching elements.

FIG. 6 is a block diagram illustrating an embodiment of a router 600, similar to the router 100, and further including one or more redundancy switches 604 embedded within line cards 602A, 602B. Similar to the router 100, the router 600 includes line cards 602A, 602B in communication with the primary switch fabric 104 and a redundant switch fabric 106 via a back plane 108. In addition, the line cards 602A, 602B include a physical interface 610, MAC framers 612 and a fabric interface 614.

Furthermore, the redundancy switch 200 can be included in each of the line cards 602A, 602B in one or more locations. In the embodiment illustrated, each line card 602A/602B includes two switches located between the physical interface 610 and a MAC framer 612 as switch 604A1/604B1, as well as between the fabric interface 614 and the back plane 108 as switch 604A2/604B2. Details of the line card 602A will now be discussed in greater detail, however, it will be understood that the description applies equally to the line card 602B. The line card 602A includes a physical interface 610A, MAC framer 612A and fabric interface 614A which correspond to the physical interface 110A, the MAC framer 612A, and the fabric interface 114A of FIG. 1A, respectively.

As mentioned previously, the line card 602A also includes two switches 604A1 and 604A2, as well as an external port 606A. The switch 604A1 is located between the physical interface 610A and the MAC framer 612A in order to allow communication between the physical interface 610A, MAC framer 612A and the external port 606A. The external port 606A can be used in conjunction with an FPGA, PLD, ASIC, or external computing device to review data passing between the physical interface 610A and the MAC framer 612A. Using the redundancy switch described in greater detail above with reference to FIGS. 2-5, the physical interface 610A can communicate with the external port 606A or the MAC framer 612A, while avoiding additional components and/or processing power. Accordingly, the line card 602A can continue to communicate at high data speeds using the switch 604A1.

In addition, line card 602A includes switch 604A2, which can be used to communicate with the primary switch fabric 104, the redundant switch fabric 106 and the line card 602B. In certain instances, it may be beneficial for line card 602A to communicate directly with the line card 602B, without having to use the primary switch fabric 104 or the redundant switch fabric 106. To accomplish this, the switch 604A2 and 604B2 can be included into the line cards 602A, 602B. Alternatively, the switch 604A2 and 604B2 can be embedded within the back plane 108. Using the switches 604A2, 604B2, the line card 602A is able to communicate directly with the line card 602B without the use of the primary switch fabric 104, the redundant switch fabric 106, or the back plane 108.

Additional switches can be placed on the line card between the physical interface 610 and the incoming data (not shown). In this way, data from the physical interface 610A can be directly communicated to the physical interface 610B of the line card 602B and vice versa. Thus, the use of the switch 604 can enable a user to debug the data between the physical interface 610A and the MAC framer 612A, as well as communicate with the line card 602B without the use of the primary switch fabric 104, the redundant switch fabric 106, or the back plane 108.

In addition, in the embodiments discussed in greater detail above, the redundancy switch 604 can be implemented without the use of a processor and with relatively few components.

For example, only one additional component can be added to the line card 602. Thus, the switch 604 allows for greater flexibility while using fewer components then has been previously accomplished.

The foregoing description and claims may refer to elements or features as being "connected" or "coupled" together. As used herein, unless expressly stated to the contrary, "connected" means that one element/feature is directly or indirectly connected to another element/feature, and not necessarily mechanically. Likewise, unless expressly stated to the contrary, "coupled" means that one element/feature is directly or indirectly coupled to another element/feature, and not necessarily mechanically. Thus, although the drawings illustrate various examples of arrangements of elements and components, additional intervening elements, devices, features, or components may be present in an actual embodiment.

As used herein, a "node" refers to any internal or external reference point, connection point, junction, signal line, conductive element, or the like at which a given signal, logic level, voltage, data pattern, current, or quantity is present.

Thus, a skilled artisan will appreciate that the configurations and principles of the embodiments can be adapted for any other electronic system. The circuits employing the above described configurations can be implemented into various electronic devices or integrated circuits. Examples of the electronic devices can include, but are not limited to, consumer electronic products, parts of the consumer electronic products, electronic test equipments, healthcare monitors, etc. Further, the electronic device can include unfinished products. Furthermore, the various topologies, configurations and embodiments described above may be implemented discretely or integrated on a chip without departing from the spirit and scope of the description.

Although this disclosure has been described in terms of certain embodiments, other embodiments that are apparent to those of ordinary skill in the art, including embodiments that do not provide all of the features and advantages set forth herein, are also within the scope of the disclosure. Moreover, the various embodiments described above can be combined to provide further embodiments. In addition, certain features shown in the context of one embodiment can be incorporated into other embodiments as well. Accordingly, the scope of the disclosure is defined only by reference to the appended claims.

What is claimed is:

1. An integrated circuit chip including a redundancy switch, the redundancy switch comprising:
   a plurality of data inputs including at least a first data input, a second data input, and a third data input;
   a plurality of data outputs including at least a first data output, a second data output, and a third data output;
   a control input configured to control a state of the redundancy switch;
   a first state, wherein the first data input is communicatively coupled with the second data output and the second data input is communicatively coupled with the first data output;
   a second state, wherein the first data input is communicatively coupled with the third data output and the third data input is communicatively coupled with the first data output; and
   a third state, wherein the second data input is communicatively coupled with the third data output and the third data input is communicatively coupled with the second data output, wherein the redundancy switch is configured to select at least one of the first state, the second state, and the third state based on the control input.

2. The integrated circuit chip of claim 1, wherein the control input is an input pin of the integrated circuit chip and the state of the redundancy switch is determined based on a voltage level at the input pin.

3. The integrated circuit chip of claim 1, wherein
the redundancy switch selects the first state when the control input is set at a first voltage,
the redundancy switch selects the second state when the control input is set at a second voltage, and
the redundancy switch selects the third state when the control input is set at a third voltage that is between the first voltage and the second voltage.

4. The integrated circuit chip of claim 1, wherein the control input comprises a plurality of input pins of the integrated chip and the state of the redundancy switch is determined based on a configuration of activated input pins of the plurality of input pins.

5. The integrated circuit chip of claim 1, wherein the integrated circuit chip does not include a serial interface to control the state of the redundancy switch.

6. The integrated circuit chip of claim 1, wherein the redundancy switch further comprises a fourth state, wherein the first data input is communicatively coupled with the first data output, the second data input is communicatively coupled with the second data output, and the third data input is communicatively coupled with the third data output, and wherein the redundancy switch is configured to select at least one of the first state, the second state, the third state, and the fourth state based on the control input.

7. The integrated circuit chip of claim 1, wherein the third data input is communicatively coupled with the third data output in the first state.

8. The integrated circuit chip of claim 1, wherein the second data input is communicatively coupled with the second data output in the second state.

9. The integrated circuit chip of claim 1, wherein the first data input is communicatively coupled with the first data output in the third state.

10. The integrated circuit chip of claim 1, wherein the first data input is further communicatively coupled with the third data output in the first state.

11. The integrated circuit chip of claim 1, wherein the second data input is further communicatively coupled with the third data output in the first state.

12. The integrated circuit chip of claim 1, wherein the first data input is further communicatively coupled with the second data output in the second state.

13. The integrated circuit chip of claim 1, wherein the third data input is further communicatively coupled with the second data output in the second state.

14. The integrated circuit chip of claim 1, wherein the second data input is further communicatively coupled with the first data output in the third state.

15. The integrated circuit chip of claim 1, wherein the third data input is further communicatively coupled with the first data output in the third state.

16. The integrated circuit chip of claim 1, wherein the redundancy switch further comprises a fourth state, wherein the first data input is communicatively coupled with the second data output, the second data input is communicatively coupled with the third data output, and the third data input is communicatively coupled with the first data output, and wherein the redundancy switch is configured to select at least one of the first state, the second state, the third state, and the fourth state based on the control input.

17. The integrated circuit chip of claim 1, wherein the redundancy switch further comprises a plurality of switching elements configured to communicatively couple one input to one output based on a selected control input.

18. The integrated circuit chip of claim 17, wherein the plurality of switching elements comprises transconductance switching elements configured to convert a voltage input to a current output.

19. The integrated circuit chip of claim 1, wherein the redundancy switch further comprises a plurality of multiplexers and demultiplexers.

20. A line card for processing data transmitted over a network, the line card comprising:
a physical interface configured to transmit and receive bits of data over a transmission medium;
a MAC framer configured to process the data transmitted or received by the physical interface;
an external port configured to provide the data to an output; and
a redundancy switch communicatively interposed between the physical interface, the MAC framer and the external port, wherein the redundancy switch comprises:
a plurality of data inputs including at least a first data input communicatively coupled with the physical interface, a second data input communicatively coupled with the MAC framer, and a third data input communicatively coupled with the external port;
a plurality of data outputs including at least a first data output communicatively coupled with the physical interface, a second data output communicatively coupled with the MAC framer, and a third data output communicatively coupled with the external port;
a control input configured to control a state of the redundancy switch;
a first state, wherein the physical interface is communicatively coupled with the MAC framer;
a second state, wherein the physical interface is communicatively coupled with the external port; and
a third state, wherein the MAC framer is communicatively coupled with the external port, wherein
the redundancy switch selects at least one of the first state, the second state, and the third state based on the control input.

21. A router for routing data between a first line card and a second line card, the router comprising
a plurality of line cards including at least a first line card and a second line card, wherein each line card is configured to receive and transmit data over a transmission medium;
a first switched fabric configured to transmit data between the first line card and the second line card;
a second switched fabric configured to transmit data between the first line card and the second line card;
a first redundancy switch communicatively interposed between the first line card and the first switched fabric, the first redundancy switching comprising:
a plurality of data inputs including at least a first data input communicatively coupled with the first line card, a second data input communicatively coupled with the first switched fabric, and a third data input,
a plurality of data outputs including at least a first data output communicatively coupled with the first line card, a second data output communicatively coupled with the first switched fabric, and a third data output, a first control input configured to control a state of the first redundancy switch, a first state, wherein the first line card is communicatively coupled with the first switched fabric, a second state, wherein the first line card is communicatively coupled with the third data output and the third data input, and a third state, wherein the first switched fabric is communicatively coupled with the third data output and the third data input, wherein the first redundancy switch selects at least one of the first state, the second state, and the third state based on the first control input; and a second redundancy switch communicatively interposed between the second line card, the second switched fabric, and the first redundancy switch, the second redundancy switch comprising:

a plurality of data inputs including at least a first data input communicatively coupled with the second line card, a second data input communicatively coupled with the second switched fabric, and a third data input communicatively coupled with the third data output of the first redundancy switch, a plurality of data outputs including at least a first data output communicatively coupled with the second line card, a second data output communicatively coupled with the second switched fabric, and a third data output communicatively coupled with the third data input of the first redundancy switch, a second control input configured to control a state of the second redundancy switch, a first state, wherein the second line card is communicatively coupled with the second switched fabric, a second state, wherein the second line card is communicatively coupled with the first redundancy switch, and a third state, wherein the second switched fabric is communicatively coupled with the first redundancy switch, wherein the second redundancy switch selects at least one of the first state, the second state, and the third state based on the second control input.

22. The line card of claim 20, wherein the redundancy switch further comprises a fourth state, wherein an input of the physical interface is communicatively coupled with an output of the physical interface, an input of the MAC framer is communicatively coupled with an output of the MAC framer; and an input of the external port is communicatively coupled with an output of the external port, and wherein the redundancy switch is configured to select at least one of the first state, the second state, the third state, and the fourth state based on the control input.

23. The line card of claim 20, wherein in the first state, an input of the external port is communicatively coupled to at least one of an output of the physical interface and an output of the MAC framer.

24. The line card of claim 20, wherein in the second state, an input of the MAC framer is communicatively coupled to at least one of an output of the physical interface and an output of the external port.

25. The line card of claim 20, wherein in the third state, an input of the physical interface is communicatively coupled to at least one of an output of the MAC framer and an output of the external port.

26. The router of claim 21, wherein in the first state of the first redundancy switch, the third data input of the second redundancy switch is communicatively coupled to at least one of an output of the first line card and an output of the first switched fabric.

27. The router of claim 21, wherein in the second state of the first redundancy switch, an input of the first switched fabric is communicatively coupled to at least one of the third data output of the second redundancy switch and an output of the first line card.

28. The router of claim 21, wherein in the third state of the first redundancy switch, an input of the first line card is communicatively coupled to at least one of the third data output of the second redundancy switch and an output of the first switched fabric.

29. The router of claim 21, wherein in the first state of the second redundancy switch, the third data input of the first redundancy switch is communicatively coupled to at least one of an output of the second line card and an output of the second switched fabric.

30. The router of claim 21, wherein in the second state of the second redundancy switch, an input of the second switched fabric is communicatively coupled to at least one of the third data output of the first redundancy switch and an output of the second line card.

31. The router of claim 21, wherein in the third state of the second redundancy switch, an input of the second line card is communicatively coupled to at least one of the third data output of the first redundancy switch and an output of the second switched fabric.

32. A router comprising:

a line card configured to receive and transmit data over a transmission medium; and a switch communicatively interposed between the line card, a first switched fabric, and a second switched fabric, wherein the switch comprises:

a plurality of data inputs including at least a first data input communicatively coupled with the line card, a second data input communicatively coupled with the first switched fabric, and a third data input communicatively coupled with the second switched fabric, a plurality of data outputs including at least a first data output communicatively coupled with the line card, a second data output communicatively coupled with the first switched fabric, and a third data output communicatively coupled with the second switched fabric, a control input configured to control a state of the switch, a first state, wherein the line card is communicatively coupled with the first switched fabric, a second state, wherein the line card is communicatively coupled with the second switched fabric, and a third state, wherein the first switched fabric is communicatively coupled with the second switched fabric, wherein the switch operates in least one of the first state, the second state, and the third state based on the control input.

33. The router of claim 32, wherein the switch further comprises a fourth state, wherein an input of the line card is communicatively coupled with an output of the line card, an input of the first switched fabric is communicatively coupled with an output of the first switched fabric; and an input of the second switched fabric is communicatively coupled with an output of the second switched fabric, and wherein the switch is configured to operate in at least one of the first state, the second state, the third state, and the fourth state based on the control input.

34. The router of claim 32, wherein in the first state, an input of the second switched fabric is communicatively coupled to at least one of an output of the line card and an output of the first switched fabric.

35. The router of claim 32, wherein in the second state, an input of the first switched fabric is communicatively coupled to at least one of an output of the line card and an output of the second switched fabric.

36. The router of claim 32, wherein in the third state, an input of the line card is communicatively coupled to at least one of an output of the first switched fabric and an output of the second switched fabric.

\* \* \* \* \*

UNITED STATES PATENT AND TRADEMARK OFFICE
CERTIFICATE OF CORRECTION

PATENT NO. : 8,705,546 B2  
APPLICATION NO. : 13/236319  
DATED : April 22, 2014  
INVENTOR(S) : Bankman et al.

It is certified that error appears in the above-identified patent and that said Letters Patent is hereby corrected as shown below:

In the Claims

In column 14 at lines 17-18 (approx.), In Claim 20, change "receive bits of data" to --receive data--.

Signed and Sealed this
Thirtieth Day of September, 2014

Michelle K. Lee
*Deputy Director of the United States Patent and Trademark Office*